US012745055B2

(12) United States Patent
Wei et al.

(10) Patent No.: US 12,745,055 B2
(45) Date of Patent: Sep. 22, 2026

(54) METHODS, SYSTEM, TERMINAL, RADIO NODE AND CIRCUITRY

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: Sony Group Corporation, Tokyo (JP)

(*) Notice: Subject to any disclaimer, the term of this patent is extended or adjusted under 35 U.S.C. 154(b) by 272 days.

(21) Appl. No.: 18/563,956

(22) PCT Filed: Mar. 31, 2022

(86) PCT No.: PCT/EP2022/058578
§ 371 (c)(1),
(2) Date: Nov. 24, 2023

(87) PCT Pub. No.: WO2022/253482
PCT Pub. Date: Dec. 8, 2022

(65) Prior Publication Data

US 2024/0251219 A1 Jul. 25, 2024

(30) Foreign Application Priority Data

Jun. 1, 2021 (EP) .................................... 21177269

(51) Int. Cl.
*H04W 64/00* (2009.01)
*G01S 5/02* (2010.01)
*H04W 4/02* (2018.01)

(52) U.S. Cl.
CPC ............ *H04W 4/02* (2013.01); *G01S 5/0284* (2013.01)

(58) Field of Classification Search
CPC ......... H04W 4/02; H04W 72/51; H04W 4/50; H04W 64/00; G01S 5/0284; G01S 5/0027; G01S 5/0036; G01S 5/0247
See application file for complete search history.

(56) References Cited

U.S. PATENT DOCUMENTS 10,455,539 B2 10/2019 Raghavan et al.
2020/0229015 A1* 7/2020 Wang .................. H04W 64/006
2020/0275236 A1* 8/2020 Gangakhedkar ...... H04W 4/025

FOREIGN PATENT DOCUMENTS

EP 3691325 A1 8/2020

OTHER PUBLICATIONS

Nokia, Nokia Shanghai Bell, "Revised SID: Study on NR Industrial Internet of Things (IoT)", 3GPP TSG RAN meeting #81, RP-182090, Gold Coast, Australia, Sep. 10-13, 2018, 5 pages.

(Continued)

*Primary Examiner* — Said M Elnoubi
(74) *Attorney, Agent, or Firm* — XSENSUS LLP

(57) ABSTRACT

A method of configuring communications in a mobile telecommunications system, the mobile telecommunications system comprising a radio node and at least a terminal, wherein the radio node is configured to provide an air interface to the terminal for communicating with the terminal. The method comprises: the terminal determining position information for the terminal; the terminal transmitting a control message to the radio node, the control message notifying the radio node of the position information for the terminal; and the radio node determining one or more configuration for communicating with at least the terminal based on the position information.

12 Claims, 6 Drawing Sheets the terminal determining a position information for the terminal

↓ the terminal notifying the radio node of the position information for the terminal

↓ the radio node determining one or more configuration for communicating with at least the terminal based on the position information

(56) References Cited

OTHER PUBLICATIONS

3rd Generation Partnership Project, "Technical Specification Group Radio Access Network; LTE Positioning Protocol (LPP)", 3GPP TS 37.355 V16.3.0, Dec. 2020, pp. 1-298.
Bourdoux et al., "6G White Paper on Localization and Sensing", arXiv:2006.01779v1 [eess.SY], Jun. 2, 2020, pp. 1-38.
Holma et al., "LTE for UMTS OFDMA and SC-FDMA Based Radio Access", John Wiley & Sons Ltd., 2009, 232 pages.
International Search Report and Written Opinion mailed on Jul. 15, 2022, received for PCT Application PCT/EP2022/058578, filed on Mar. 31, 2022, 09 pages.

* cited by examiner

METHODS, SYSTEM, TERMINAL, RADIO NODE AND CIRCUITRY

CROSS-REFERENCE TO RELATED APPLICATIONS

The present application is based on PCT filing PCT/EP2022/058578, filed Mar. 31, 2022, which claims priority from European Patent Application No. 21177269.4, filed Jun. 1, 2021, the entire contents of each are incorporated herein by reference.

FIELD

The present disclosure relates to Methods, System, Terminal, Radio Node and Circuitry.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles and to provide more advanced services and functionalities.

An example of such a new service is referred to as an Ultra Reliable Low Latency Communications (URLLC)

service which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices, services and functionalities gives rise to new challenges for efficiently handling communications in wireless telecommunications systems.

SUMMARY

The present invention is defined in the independent appended claims. Further embodiments are provided in the dependent claims.

It is to be understood that both the foregoing general description and the following detailed description are illustrative only and are not restrictive, of the techniques and teachings of the present disclosure.

While the present disclosure includes example arrangements falling within the scope of the claims, it may also include example arrangements that do not necessarily fall within the scope of the claims but which are then useful to understand the teachings and techniques provided herein.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF EXAMPLES

Long Term Evolution Advanced Radio Access Technology (4G)

Figure 1:
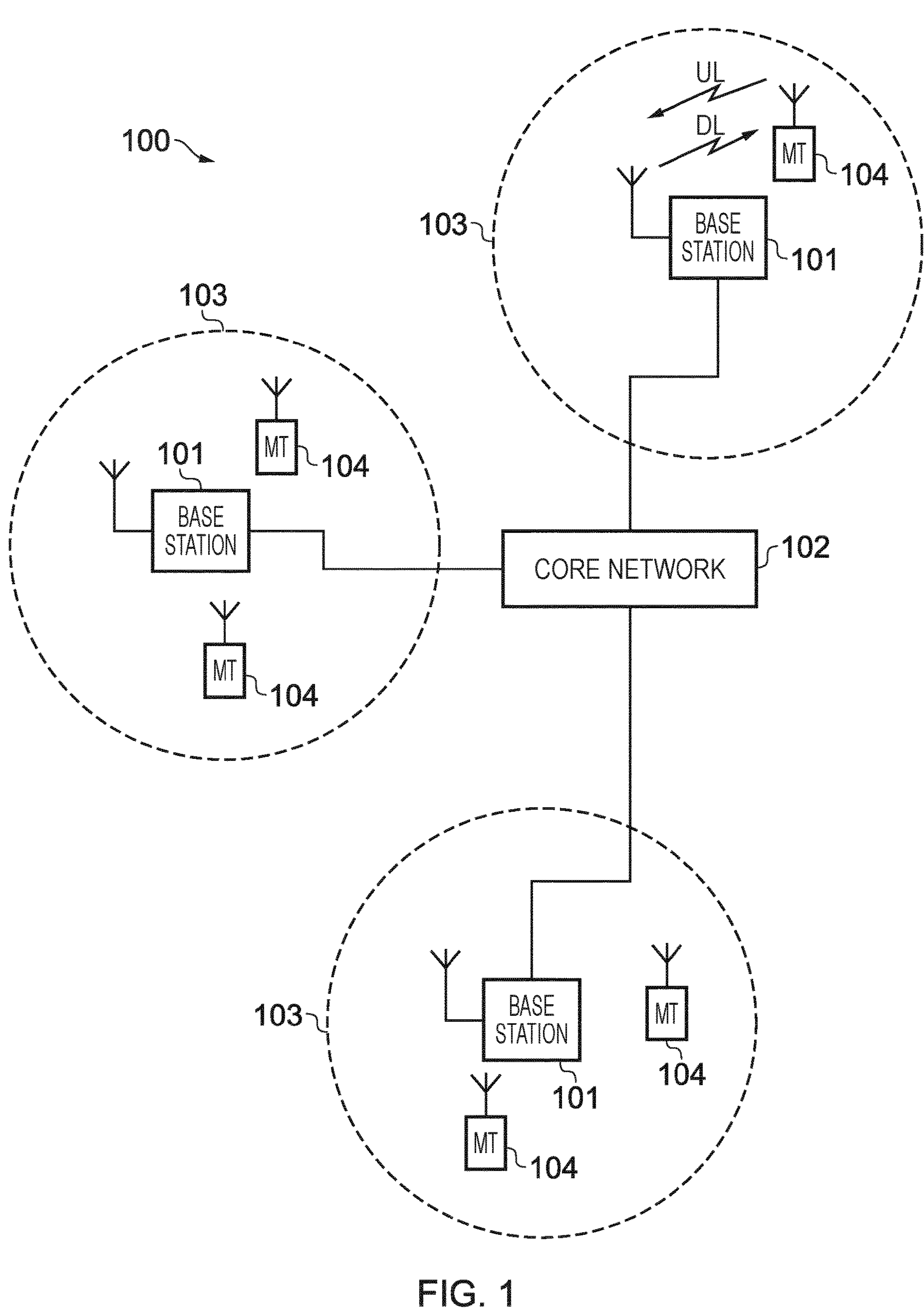
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H, and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, mobile terminals (MT), user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
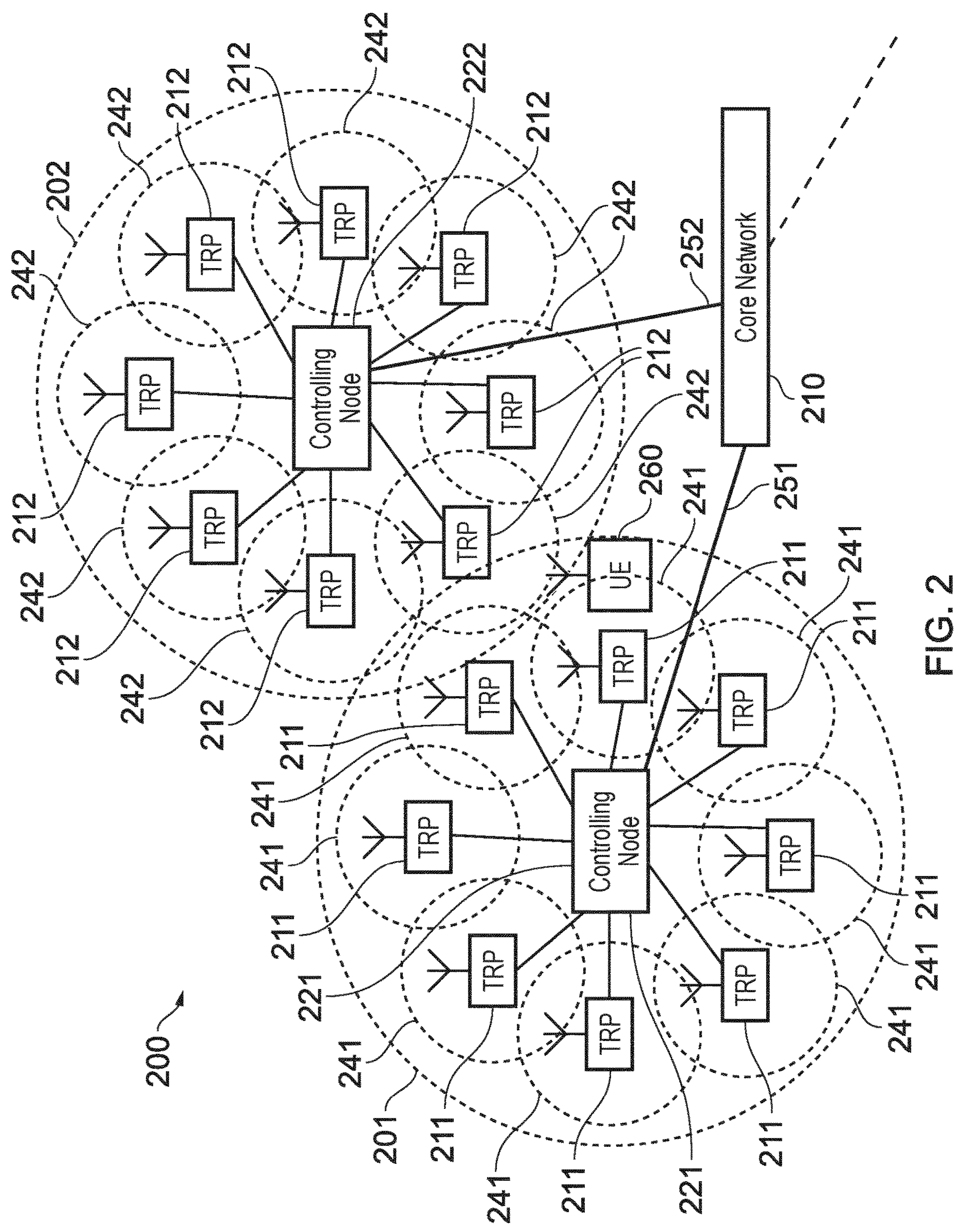
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or mobile terminal or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
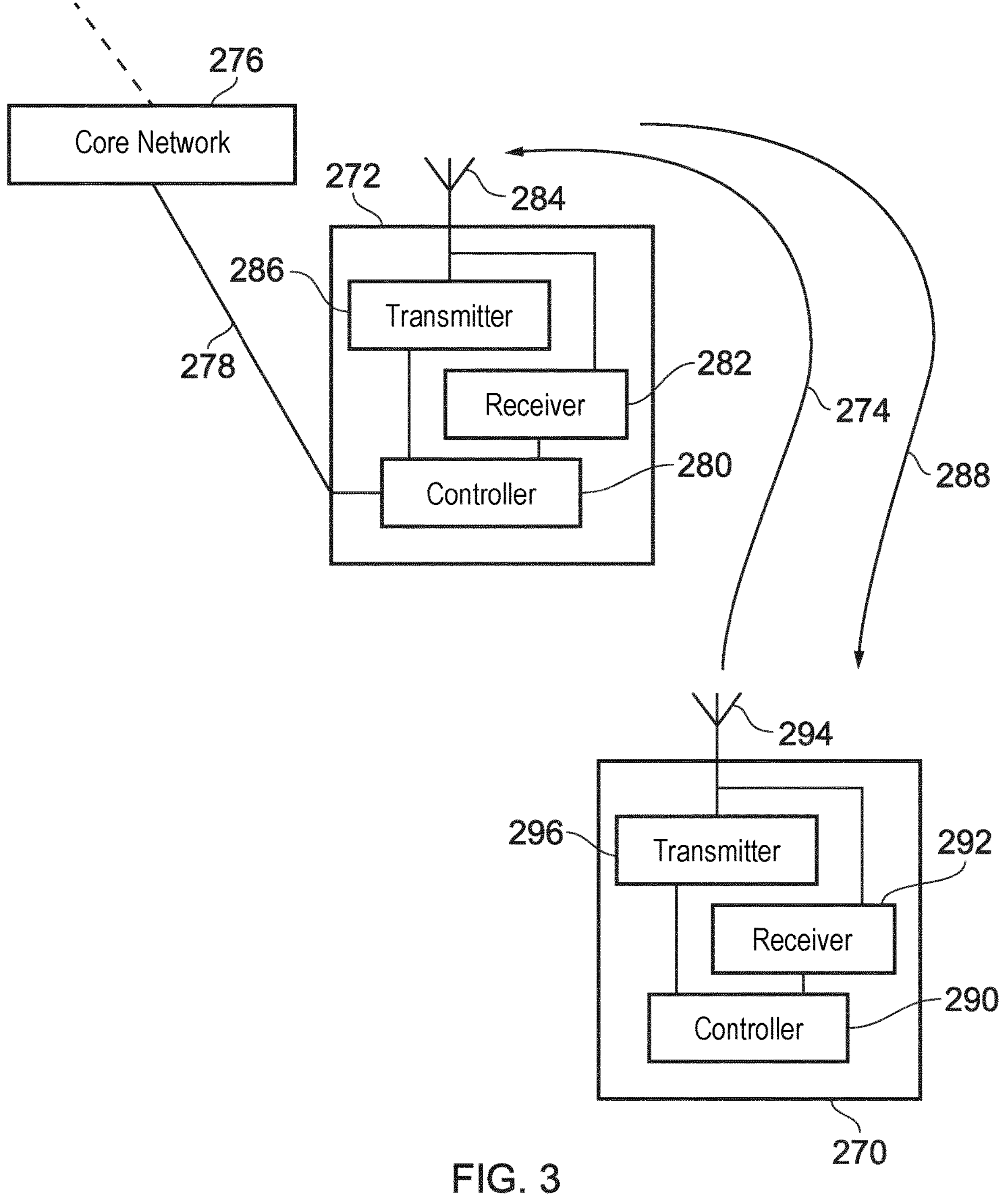
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Simultaneous Localization and Mapping (SLAM)

Traditionally, Simultaneous Localization And Mapping or SLAM is a process by which a mobile device (often a robot) can build a map of an environment and at the same time use this map to compute its own location within the generated map. Such techniques have been used for example in robotics, such as in robot vacuum cleaners.

There have been discussion about integrating SLAM techniques and wireless communications system. In other words, at least some elements of both SLAM and wireless communications are beginning to converge, where it is anticipated that future 6G systems can be integrated with SLAM by providing communications and sensing (i.e. localisation and mapping) at the same time. For example, a 6G waveform can be employed to provide good spectral and power efficiency as well as positioning and range measurements in 4D (i.e. range, velocity, azimuth, and elevation angle).

A recent white paper "6G White Paper on Localization and Sensing" [3] provides a discussion on 6G and localisation. The discussion includes:

"In SLAM, mobile devices are considered as sensors, with time-varying states (position, pose, as well as their derivatives), and landmarks (object), with fixed or slowly changing states. Both sensor states and landmark states are a priori unknown. A sensor moves through the environment and collects measurements in its local frame of reference related to the landmarks. These measurements may be from 6G radar-like signals originating from the mobile device or from fixed infrastructure. The sensor has an associated mobility model, describing the evolution of the sensor state statistically as it moves. SLAM algorithms aim to recover estimates of the sensor state (including the entire sensor state trajectory) as well as state estimates of the landmarks." (section B. Simultaneous localization and mapping, pages 22-23)

This paper [3] discusses that many of the implementation challenges of SLAM technologies in a 6G or radio environment arise from the reduced accuracy and range of measurements with radio signals compared to more conventional implementations. For example, the use of radio reference signals, rather than lasers or other technologies can have an impact on the measurement and sensing process.

When integrating SLAM techniques in a radio network, it is anticipated that some additional measurements may be introduced to support SLAM. Such measurements may for example include one or more of: an Angle of Arrival (AoA, direction from which the signal is received), a Time of Arrival (ToA, absolute time instant when a radio signal emanating from a transmitter reaches a receiver), a Time Difference of Arrival (TDoA, difference between the ToAs), a Received Signal Strength (RSS, strength of a received signal measured at the receiver's antenna), a Differential Received Signal Strength (DRSS, differential processing of the signal), amongst possibly others.

While these measurements are expected to be used for the mobile devices to build and navigate a map, it is recognised herein that some of the measurements may be of additional benefits to the network.

Location Information in Mobile Networks

Conventionally, location information from a terminal or device is sent to the network, namely to a LoCation Services (LCS) server. The information sent to the LCS server may for example be used by the network (e.g. the Evolved Packet Core "EPC" or Evolved Packet System "EPS"), by network services, by third party services or application, emergency services, etc.

For example, 3GPP document TS 37.355 v16.3.0 [4] defines a ProvideLocationInformation message is transmitted from a measuring device to location or LCS server for providing measurement results.

ProvideLocationInformation

The ProvideLocationInformation message body in a LPP message is used by the target device to provide positioning measurements or position estimates to the location server.

```
-- ASN1 START
ProvideLocationInformation : := SEQUENCE {
  criticalExtensions      CHOICE {
    c1                  CHOICE {
      provideLocation Information-r9
      ProvideLocationInformation-r9-
IES,
      spare3 NULL, spare2 NULL, spare1 NULL
    },
    criticalExtensionsFuture    SEQUENCE { }
  }
}
ProvideLocation Information-r9-IEs : := SEQUENCE {
  commonIEsProvideLocationInformation
      CommonIEsProvideLocationInformation
  OPTIONAL,
  a-gnss-ProvideLocationInformation    A-GNSS-
ProvideLocationInformation OPTIONAL,
  otdoa-ProvideLocationInformation    OTDOA-
ProvideLocationInformation    OPTIONAL,
  ecid-ProvideLocationInformation      ECID-
ProvideLocation Information    OPTIONAL,
  epdu-ProvideLocationInformation    EPDU-Sequence
  OPTIONAL,
  . . . ,
  [ [
  sensor-ProvideLocationInformation-r13
          Sensor-ProvideLocationInformation-r13
            OPTIONAL,
  tbs-ProvideLocationInformation-r13 TBS-
ProvideLocationInformation-r13 OPTIONAL,
  wlan-ProvideLocationInformation-r13    WLAN-
ProvideLocationInformation-r13 OPTIONAL,
  bt-ProvideLocationInformation-r13 BT-
  ProvideLocationInformation-
r13 OPTIONAL
  ] ],
  [ [ nr-ECID-ProvideLocation Information-r16
```

-continued

```
          NR-ECID-ProvideLocationInformation-r16
    OPTIONAL,
      nr-Multi-RTT-ProvideLocationInformation-r16
          NR-Multi-RTT-ProvideLocationInformation-
r16 OPTIONAL,
      nr-DL-AoD-ProvideLocationInformation-r16
          NR-DL-AoD-ProvideLocationInformation-r16
    OPTIONAL,
      nr-DL-TDOA-ProvideLocationInformation-r16
          NR-DL-TDOA-ProvideLocationInformation-r16
    OPTIONAL
    ] ]
}
-- ASN1 STOP
```

For example, nr-DL-AoD-ProvideLocationInformation-r16 and nr-DL-TDOA-ProvideLocationInformation-r16 provide fields for a device to report on a measured Downlink Angle-of-Departure (DL-AoD) and on a Downlink Time Difference Of Arrival (DL-TDOA), respectively. These are defined in more detail in the same document [4]:

NR-DL-AoD-ProvideLocationInformation

The IE NR-DL-AoD-ProvideLocationInformation is used by the target device to provide NR DL-AoD location measurements to the location server. It may also be used to provide NR DL-AoD positioning specific error reason.

```
-- ASN1START
NR-DL-AoD-ProvideLocationInformation-r16 : := SEQUENCE {
  nr-DL-AoD-SignalMeasurement Information-r16
    N.R-DL-AoD-
SignalMeasurementInformation-r16
    OPTIONAL,
  nr-dl-AoD-LocationInformation-r16      NR-DL-AOD-
LocationInformation-r16
    OPTIONAL, --
Cond UEB
  nr-DL-AoD-Error-r16                NR-DL-AoD-Error-r16
  OPTIONAL,
  . . .
}
-- ASN1STOP
```

and

NR-DL-TDOA-ProvideLocationInformation

The IE NR-DL-TDOA-ProvideLocationInformation is used by the target device to provide NR DL-TDOA location measurements to the location server. It may also be used to provide NR DL-TDOA positioning specific error reason.

```
-- ASN1 START
NR-DL-TDOA-ProvideLocationInformation-r16 : := SEQUENCE {
  nr-DL-TDOA-SignalMeasurementInformation-r16
    NR-DL-TDOA-
SignalMeasurement Information-r16
    OPTIONAL,
  nr-dl-tdoa-LocationInformation-r16      NR-DL-TDOA-
LocationInformation-r16
    OPTIONAL, --
Cond UEB
  nr-DL-TDOA-Error-r16              NR-DL-TDOA-Error-r16
  OPTIONAL,
  . . .
}
-- ASN1 STOP
```

As mentioned above, these measurements are only available for and visible to the location or LCS server and are transparent to lower layers e.g. AS layer in the mobile network.

Location Information and Base Stations

While the current positioning information, which focus on angle and timing related information, are made available to a location or LCS server, other parts of the network are not aware of these measurements. While SLAM systems might provide new or evolved services or applications relating to localisation or positioning, such systems are likely to suffer from the same limitations as conventional localisation or positioning systems and techniques.

In accordance with techniques of the present disclosure, localisation or positioning information is obtained by a measuring device or terminal and is transmitted to the base station, where the base station can make use of this information to configure communications with the device or terminal.

Accordingly, the localisation or positioning measurements which may be obtained by the terminal, e.g. for sending to a location or LCS server, may be transmitted to the base station and the communications may be configured and adapted based on these measurements.

Figure 4:
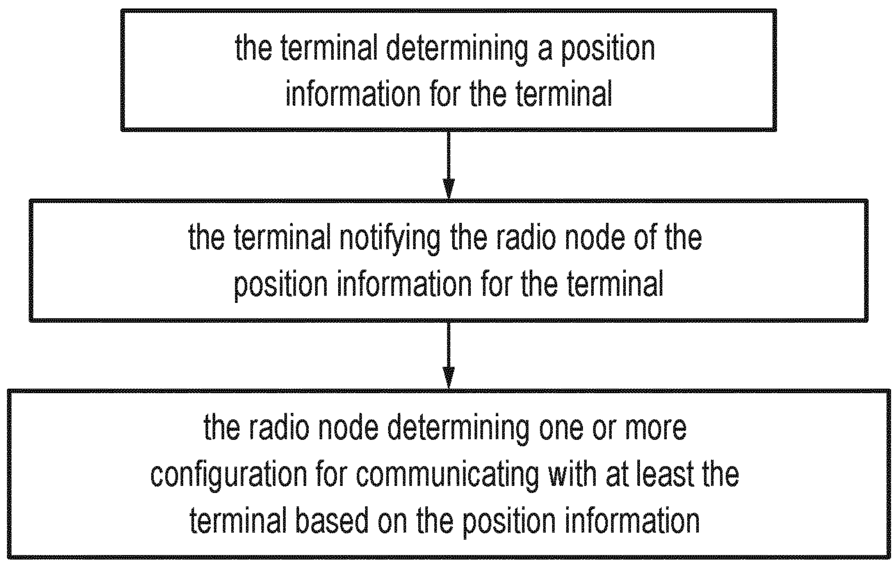
FIG. 4 illustrates an example method in accordance with the present disclosure.

It is also noted that in some legacy systems, where timing adjustments are deemed appropriate, the base station is expected to determine the extent of the timing adjustment and to adjust its communications with the terminal accordingly, e.g. by configuring downlink or uplink transmissions accordingly. In other words, the base station makes a determination on how to configure for example the timing of the communications with the terminal based on information it determines independently and this is not based on information obtained from the terminal. FIG. 4 illustrates an example method in accordance with the present disclosure. In accordance with this method, the terminal determines position information for itself. For example, the position information may comprise an absolute position information (such as coordinates in a geolocation system, like a GPS system, Galileo, system, etc.) and/or relative position information. The relative position information can for example be indicative of a relative position of the terminal with respect to the radio node. In some cases, relative position information can comprise one or more of (i) angle related information, such as an angle relative to an uplink or downlink beam of the radio node; (ii) timing related information, such as an uplink or downlink time or time difference; geographical position information, such as an estimated distance or relative position relative to the radio node; and orientation information, such as a pitch, roll and/or yaw measurement. The angle and/or timing related information might for example be measured by the terminal. Such measurements, for example for relative position information, might involve the terminal making measurements using one or more reference signals, beacons or other signals transmitted by the radio node. In some cases, legacy measurements might be used (for example re-using measurements already obtained where the measurements are sent to a location or LCS server). Alternatively or additionally, the terminal might use other measurement techniques, for example for obtaining alternative or additional measurements.

Then, the terminal can notify the radio node of position information by transmitting a control message to the radio node. The terminal can thereby report the position information to the radio node. In contrast, many systems rely on the terminal notifying a location or LCS server of location information, where the radio node does not have access to location information. Namely, the base station will forward The messages sending this information but it will be unaware that it is carrying location information, let alone be aware of what the content of the location information is.

The radio node can then determine one or more configurations for communicating with at least the terminal based on the position information. For example, based on the position information, the radio node may determine one or more of: to activate a beam for communicating with the terminal (e.g. using position and/or angle information); to determine a precoding matric indicator to be adopted for communicating with the terminal (e.g. using position and/or angle information); to determine a rank indicator to be adopted for communicating with the terminal (e.g. using position and/or angle information); to activate a further radio node for communicating with the terminal, jointly with the first radio node or instead of the first radio node; one or more scheduling time opportunities for transmitting one or more signals to the terminal; a configuration of a reporting mode of the terminal; and a configuration of at least one of a number of reporting occasions, a reporting period, a reporting timer, a type of information to report.

For example, the radio node determining a configuration of a reporting mode may comprise the radio node one or more of: determining to activate of one or both of an ad-hoc reporting mode and a periodic reporting mode; configuring an ad-hoc reporting mode (e.g. number of message(s), timing, etc.); configuring a periodic reporting mode (e.g. reporting opportunities or timing, duration, period, etc.); configuring a number of reporting occasions; configuring a reporting period; configuring a timer for reporting position information, wherein the terminal stops transmitting control messages notifying the radio node of position information after expiry of the timer; configuring a time window for reporting position information, wherein the terminal is configured to transmit control messages to notify the radio node of the position information when within the time window and to stop transmitting control messages notifying the radio node of the position when outside of the time window; and configuring a trigger condition for the terminal, wherein the terminal is configured to transmit the control message notifying the radio node of the position information upon determining that the trigger condition is met. Accordingly, the mobile might use the position information, not only to configure how the radio node communicates with the terminal (e.g. which beam to use, when to schedule, etc.) but also to configure how the terminal communicates with the radio node for reporting (further) position information.

For example, the radio node may also notify the terminal of the determined configuration of the reporting mode; and the terminal may then transmit a further control message based on the configuration of the reporting mode, the further control message notifying the radio node of further position information for the terminal.

In some examples, the terminal may be configured to transmit the control message notifying the radio node of the position information upon determining that a reporting trigger condition is met. The trigger condition may be partially or fully predefined or defined by the radio node (e.g. based on the position information or on previous position information, where the position information may inform the configuration of the trigger condition(s)).

As discussed in more detail below, the control message may be at least one of: a MAC message, a MAC-CE message, a PDCP control PDU, a PDCP data PDU an RLC control PDU, an RLC data PDU, a layer 1 message, a UCI message and an RRC message. The terminal may also send the position information in such a control message and may send further position information in a further control message which is a different one of a MAC message, a MAC-CE message, a PDCP control PDU, a PDCP data PDU an RLC control PDU, an RLC data PDU, a layer 1 message, a UCI message and an RRC message. This may for example be used in cases where the control message is for reporting absolute measurement values (e.g. quantized values) and where the further control message is for reporting a differential or delta value in respect of a previously reported value (either previously reported as an absolute value or as an absolute value adjusted one or more times with a delta value).

The method may further comprise the terminal transmitting an additional message, the additional message being sent to a location server and comprising the position information. For example, the position information may be used additionally by applications, such as SLAM, third party applications using location information, a location server, a network-based location service, etc.

Figure 5:
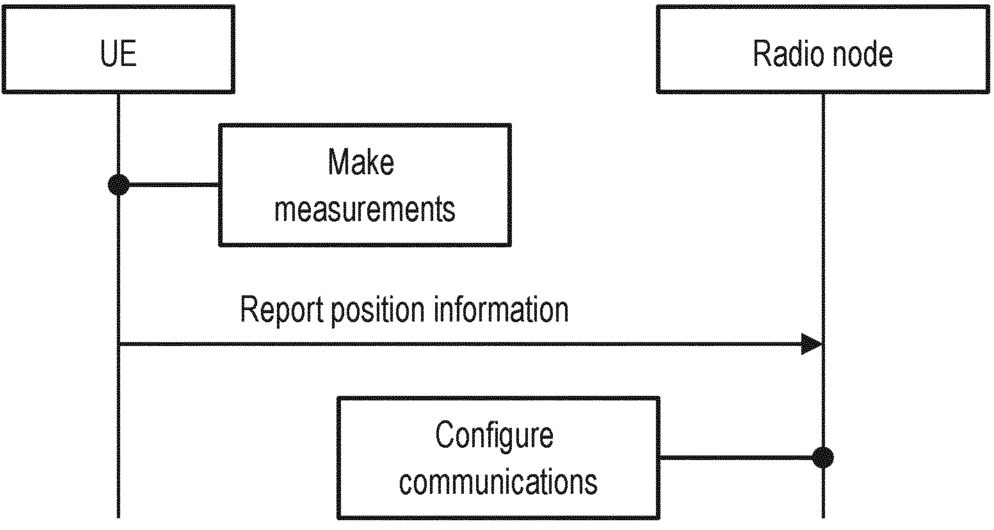
FIG. 5 illustrates an example call flow.

FIG. 5 illustrates an example call flow which corresponds to the method of FIG. 4. The terminal first makes measurements to obtain position information and then reports the position information to the radio node. Based on the reported position information, the radio node can configure communications with the terminal.

It will also be appreciated that, as discussed below, the order for carrying out the method steps may differ from that illustrated in the figures. For example, in some cases the radio node may configure the communications with the terminal and then the terminal may make measurements and report on these measurements. In some cases, the radio will not make any further adjustments to the communications while in other cases it might configure the communications (e.g. radio communications and/or reporting configuration) accordingly.

Accordingly, by providing such position information to the radio node (e.g. base station, relay node, RRH, etc.), the communications with the terminal may be adjusted to better correspond to the terminal's situation.

Position Information Reporting

One or more techniques may be used for the terminal to report the position information to the radio node. The terminal can for example be configured to report or notify the position information in a control message to the radio node (e.g. base station). In a first example, the terminal may transmit the position information in a MAC message, such as a MAC message for sending control information (e.g. a MAC Control Element "MAC CE" message).

One or more new control (e.g. MAC CE) messages may be defined to report these measurements from the terminal. In some cases, a single size control message may be configured for the terminal while in other cases, the terminal may be configured to use a variable size control message or to select one of a plurality of fixed size control messages (e.g. different type of message lengths) depending on the size of the measurement(s) to be reported and/or on the type of measurement(s) to be reported.

Figure 6:
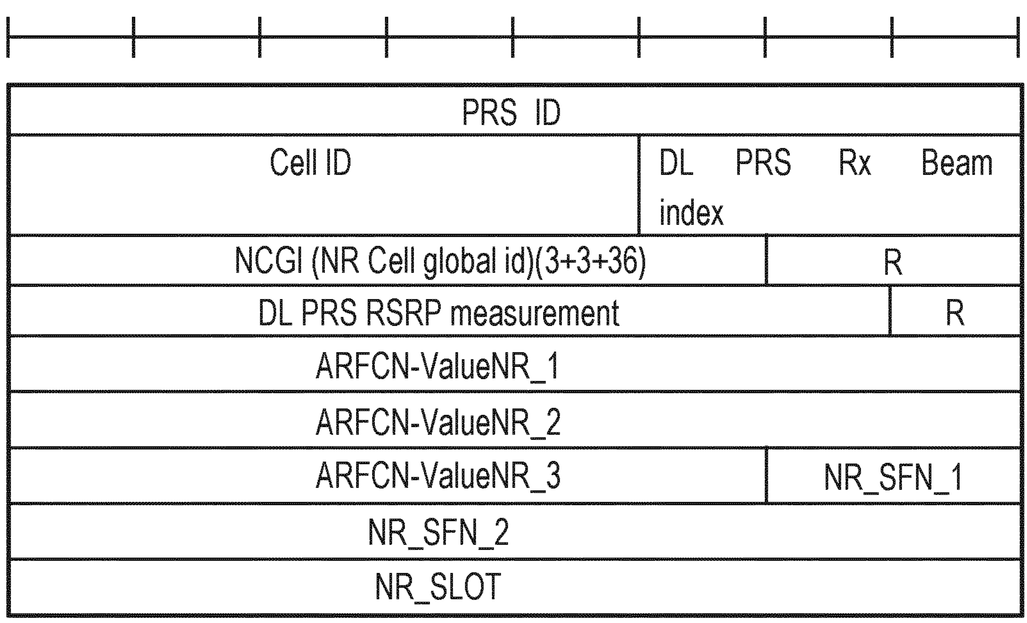
FIG. 6 illustrates an example control message for reporting position information.

FIG. 6 illustrates an example control message for reporting position information, using as an illustrative example, a MAC-CE message for reporting a "Time of Departure" (ToD) measurement. In this example, the timestamp associated with the message of FIG. 6 may be defined as NR_TimeStamp=(PRS ID, Cell ID, NCGI, ARFCN, SFN, Slot). While this example illustrates a 72-bit message, as mentioned above, in other examples the message might be a shorter or longer message.

As hinted above, one or more control messages (e.g. MAC-CE messages) may be used, for example depending on size and frequency of updates. If messages may be of different sizes, this may be implemented using either of or both of (i) a variable size control message and (ii) using two or more fixed size control messages of different sizes.

It will also be appreciated that the MAC-CE example is an illustrative example of a control message which may be suitable to use for reporting the position information, such as position measurements. Other control messages may be used, for example using in a Radio Link Control "RLC" Control Packet Data Unit "PDU" or a RLC data PDU (e.g. a data PDU of a special type adapted for reporting the position information). Alternatively or additionally, a Packet Data Convergence Protocol "PDCP" control PDU or PDCP data PDU may be used. For example, in cases where CU and DU entities coexist or where a scheduling entity is physically and/or logically close (in terms of security association and access) to where the PDCP entity is hosted, using a PDCP message might also be appropriate. A PDCP data PDU may be used in some cases, for example if a current AS security context (for other PDCP data PDUs) can be used. Alternatively or additionally, position information may also be sent (partially or fully) using RRC signalling to the radio node.

Figure 10:
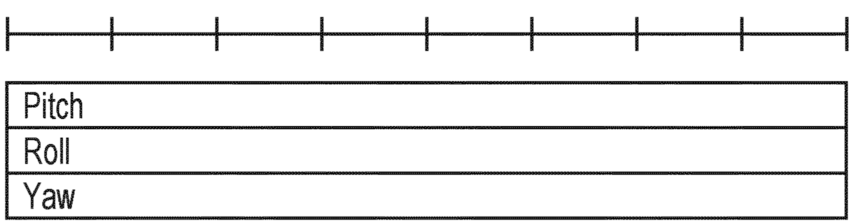
FIG. 10 illustrates another example control message for reporting position information.

In some cases, the control message for notifying the position information may sent using layer 1 "L1" signalling, such as in an Uplink Control Information "UCI" message. One or more of the following techniques may be used:

1. Quantized orientation information included in the layer 1 message: several bits are allocated for each of the reported measurements. For example, 8 bits may be allocated for Pitch, 8 bits for Roll, 8 bits for Yaw (as illustrated in FIG. 10).
2. Delta or relative position (e.g. orientation) information: where the information reported can be reported as a delta or difference relative to the last reported information. This is expected to reduce the amount of bits used to report the position information. For example, the terminal can provide delta orientation information comparing with its last report such as 0 means the pitch has changed 10 degree, 1 means the pitch has changed −10 degree etc.

A combination of these two techniques may be used, for example where the terminal first report absolute or full measurements (in a layer 1 message or other) and may then report relative or delta values, for example to report on successive changes of the measurement values (potentially in the same type of message or using a different type of message, e.g. a different protocol).

It should note that if the measure (e.g. of an angle) is reported using n bits (e.g. 8 bits), an error on the Most Significant Bit "MSB" will have the greatest impact on the received measurement (a 45 deg error in this example), while an error on the Least Significant Beat "LSB" will have the smallest impact (a 1.4 deg error in the same example). With this in mind, the MSB side of the message can preferably be better protected or recoverable than that in LSB side. For example, an unequal Error Correction Codes to try to better protect the integrity of the transmitted measurements. For example, a Reed-Muller code may be used to this end.

Radio Node's Configuration of Communications

For example, the scheduler and/or controller of a communication unit (or radio unit) of a base station may be able to do one or more of the following in some examples:

The angle information might be of particular relevant to enable the scheduler to have a better knowledge or understanding of which beam or beams might serve the terminal better. For example, the radio node (e.g. base station) might use the information to decide which beam should be activated and/or to decide what the precoding matrix indicator "PMI" or rank indicator "RI" should be adopted.

The timing information (e.g. ToA, TDoA) might be of particular relevance for the scheduler or network to have a better knowledge or understanding of which transmitting node (e.g. base station, RRH, relay, etc.) may be activated. For example, it may determine that one or more base stations will be activated in a joint or dual transmission mode with the current radio node (e.g. base station). The timing information may for example be used to determine one or more of: activating dual connectivity, determining on which radio frame, sub-frame or slot the terminal should be scheduled, etc.

The positioning information (e.g. angle, timing and/or orientation related information) may also assist the radio node (e.g. base station) in determining one or more measurement configuration (e.g a measurement reporting configuration). This may include configure characteristics such as whether the reporting may be an ad-hoc (e.g. "one-shot" or on request) report or a periodic report. If the report is periodic, this may assist in determining a periodicity, a reporting timer (where the reporting process stops or terminates once the timer has expired). Such configuration may for example be based on the terminal's position e.g. relatively closer to or further away from a landmark, located in an important area or blind spot on map, etc.

More generally, the position information may be used to support both SLAM functionalities and used by the radio node to configure one or more of:

- determining (for example by a scheduler) which beam should be activated
- determining (for example by a scheduler) which PMI or RI should be adopted;
- determining (for example by a scheduler) which base station(s) should be activated;
- determining (for example by a scheduler) which base station(s) should be activated for joint transmission, e.g. to provide dual connectivity;
- determining (for example by a scheduler) on which radio frame, sub-frame and/or slot of an activated base station, the terminal should be scheduled transmissions; and
- determining one or more measurement reporting configurations.

As mentioned above, the radio node (e.g. base station) may determine a reporting configuration based on the position information. The reporting configuration can relate to reporting position information and, in some cases, additional information at the same time if appropriate.

For example, the base station may determine one or any combination of the following configuration aspects.

Timing of reporting

The radio node may use the position information to configuring an ad-hoc and/or periodic reporting for the position information. For example, the terminal may be configured to send a single ad-hoc report to notify the radio node of the position information. In other cases, it may be configured to send a predetermined number of such ad-hoc reports (e.g. two, three, etc. reports).

The terminal may additionally or alternatively send periodic reports. The terminal may for example be configured to notify the radio node of position information on a periodic basis. The reporting configuration may in such cases include a period configuration, which may be defined based on a number of time units (e.g. milliseconds, sub-frames, frames, etc.) or relative to predefined reporting opportunities (e.g. configuring the terminal to report using one in every three predefined reporting opportunities, and optionally defining the first of the selected reporting opportunities).

The terminal may in some examples be configured to report periodically until a stopping condition is met. A stopping condition may for example be: a number of report sent, a timer having expired (see below), an operating mode condition (e.g. the terminal or terminal's transceiver being turn off, disconnected from the radio node, going into a sleep or idle mode, etc.).

As mentioned, the terminal may be configured with a timer: when the timer expires, the terminal can stop reporting or terminate the current reporting process in which the position information was sent.

In some cases, the terminal may also be configured (by the radio node or pre-configured) with a prohibit timer so that the terminal stops reporting when it is reporting the same or similar position information to the radio node. This may be helpful to reduce the likelihood of the terminal unnecessarily using network resources and reducing the overall throughput and efficiency of the network.

Trigger Conditions

The terminal may be triggered to send a position information report based on one or more triggers or trigger conditions.

For example, with a periodic reporting configuration, the terminal will be periodically prompted to transmit a position information report.

In other cases, the terminal may receive a request received from the radio node or another paired terminal. In such cases, a report or a plurality of reports may be transmitted on demand rather than on a periodic basis.

The terminal may also be prompted to send a report when the difference in one or more of the position measurements is greater than a predetermined threshold. For example, as long as one of the measurements for a type of position information remains within a predetermined range of the last reported measurement for this type of position information, the terminal will not report on this type of position information. If on the other hand the measurements fall outside of the predetermined range, the terminal may be triggered to report on the measurements, once it has identified that the trigger condition has been met.

A predetermined range can be for example measurements within a predetermined ratio (+/−10% or +/−20%) of the last reported measurement or within a predetermined fixed range from the last reported measurement (e.g. +/−5 deg or +/−10 deg for an angle measurement, +/− a predefined number of milliseconds or microseconds for a time measurement)

It will be appreciated that the reporting configuration may be partially or fully preconfigured in the terminal and/or configured using other techniques, such as using system information broadcasted by the radio node.

As the architecture of mobile networks evolves, the different functions of what can sometimes be defined as a base station may be found in different logical and/or physical entities. It will be appreciated that the radio node in accordance with the present invention may be implemented by two or more logical entities and/or by two or more physical entities.

Figure 7:
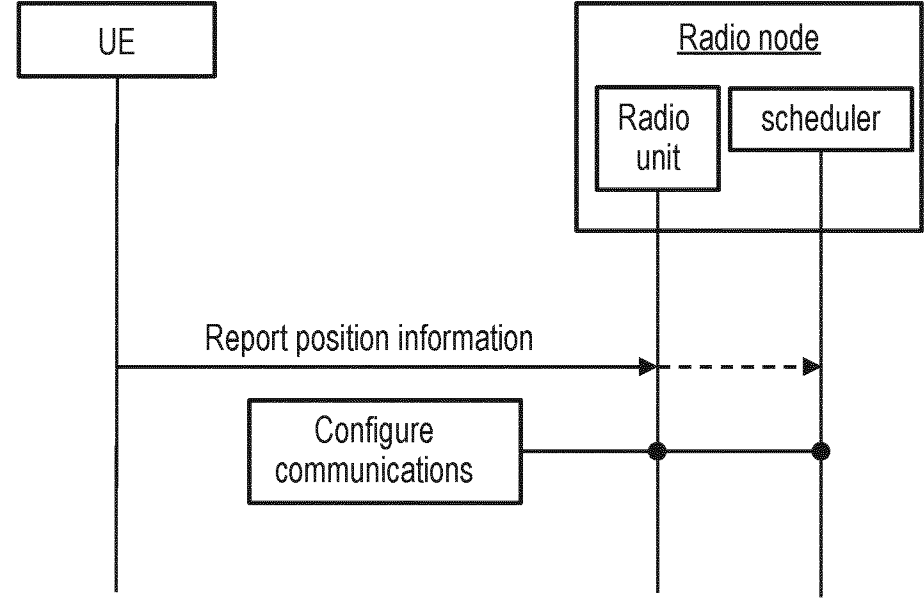
FIG. 7 illustrates another example call flow.

Another example of a call flow is illustrated in FIG. 7, which shows an example of a radio node in accordance with the techniques and teachings discussed herein. In this example, the radio node comprises a radio or communication unit and a scheduler. For the sake of conciseness, the measuring step by the terminal has not been represented, but the discussions above and below in this respect apply equally to this example. With a radio node having such a structure, the radio unit will receive the position information from the terminal and the radio unit and/or scheduler might update their respective configuration based on the position information.

For example, the radio unit and/or or scheduler may activate one or more beams depending on the position information from the terminal. Additionally or alternatively, the scheduler may update the configuration for the communications with the terminal. Depending on the implementation, and for example on the protocol used for the different logical entities of the radio node (when a plurality of logical entities operate collectively to implement the radio node), the radio unit may provide the position information to the scheduler. In some examples, the radio unit may use an interface with the scheduler to notify the scheduler of the message received. This may be based on a configuration of the unit, on a subscription-based model of notification, etc. In some examples, the radio unit may forward the message using a native mode of operation of the unit: if for example the radio unit is associated with a protocol and the scheduler is associated with a higher level protocol, the radio unit may forward the higher level message to the scheduler in a conventional and transparent manner, e.g. without being aware of the message relating to position information. In such cases, the radio unit may not have access to the position information (unless the scheduler informs the radio unit) and the scheduler only may be configuring the communications with the terminal.

It will thus be appreciated that different models of radio nodes might be used for implementing the techniques discussed herein.

Figure 8:
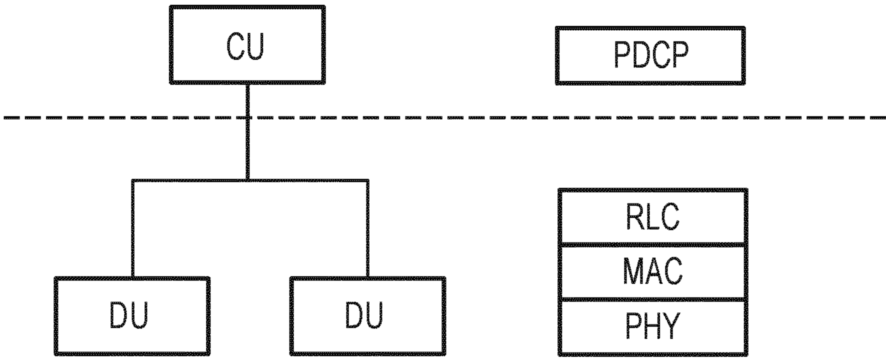
FIG. 8 illustrates an example of protocol implementation in a CU-DU architecture.

FIG. 8 illustrates an example of protocol implementation in a CU-DU architecture. In this example, the PHY, MAC and RLC functions are implemented in the DU part and of the system and the PDCP function is implemented in the CU part of the system. While this correspond to some existing system, the separation between functions and units can also conceivable be different than in FIG. 8 and the same teachings would apply equally.

In cases where the network may comprise a CU/DU architecture, as illustrated in FIG. 8, and where the configuration to be updated based on the position information is that of the DU, the message reporting the position information may preferably be a MAC or RLC message. However and as mentioned above, a PDCP message may still be used, for example in cases where the CU is co-located or in close (logical and/or physical) proximity to the DU.

Also, while in many cases the radio node is expected to be a base station, DU, CU, RRH and/or relay node in other cases the radio node may be another terminal. For example, it may be another terminal to which the current terminal is connected. This may be a connection via a side-link such as a link between two terminals in accordance with a D2D system.

Position Information Types

In additional to some of the position information mentioned above, which can be found in some of the legacy systems and which are then reported to a location or LCS server, further measurements may be made and reported by the terminal. These measurements can for example be made also for SLAM purposes and may be reported to the base station with a view to improving the operation of the network.

Figure 9:
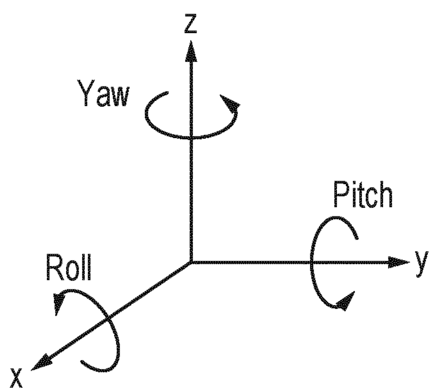
FIG. 9 illustrates an example of yaw, roll and pitch rotations.

For example, and as illustrated in FIG. 9, the terminal may measure one or more of the pitch, roll and yaw rotations and report the measurement(s) to the radio node.

Orientation information may for example be useful to adjust the transmission beam (e.g. by the scheduler). In particular, it is expected that future networks might be more sensitive to finer position changes, including orientation changes. Legacy systems rely on measurements of reference signals (e.g. SRS) transmitted by the UE to adjust beam configuration. The accuracy of such measurements might have been deemed sufficient for legacy system but there is a risk that they may not sufficient for future systems, such as 6G systems. For example, beams could be much narrower and therefore, with more sensitive to smaller position changes such as orientation change, as the beam may not reach UE any longer or may reach the terminal with a much lower quality or power.

Additionally or alternatively, orientation information may also be used with a view to optimising scheduling mechanisms, for example with a view to optimising existing or legacy passive scheduling systems to more proactive and intelligent scheduling systems. Legacy scheduling mechanisms are usually based on the terminal's feedback, e.g. Channel Quality Information "CQI", in order to schedule the UE in next scheduling opportunity. In NR/5G, symbol level scheduling is supported however, it may still not be flexible, reliable or consistent enough for 6G systems. For example, with systems with a higher spectrum, there is a more direct correlation between propagation path and propagation environment. Accordingly, if only channel state information (e.g. CQI) is used, it is unlikely to provide a reliable enough assessment of the propagation along the path and for example to predict a possible transmission hazard on the transmission path. As a result, channel state information on its own may not provide a level of information which is sufficient to efficiently schedule transmissions to terminals in 6G. Using orientation information as (part of the) position information, and optionally together with other location/map information, the scheduler can improve the accuracy of its expected or predicated propagation characteristics of the transmission link, thereby improving the scheduling operations of the radio node. It is also expected that orientation information may in many cases be more predictable than other information relating to the link between the terminal and radio node, such as channel condition. The prediction accuracy can therefore be improved when using orientation information which is expected to be relatively reliable and to remain up-to-date on average for an amount of time that is expected to be sufficient to make the information useful to improve accuracy.

It should be noted that, in addition to orientation information, the terminal may also in some cases provide:

- the absolute axis coordinates of a target object, where the target object can for example be the terminal itself. In this case the terminal may for example report on its own position (e.g. using coordinates) and its orientation and/or
- the relative distance to a-known reference object. In this case the terminal may for example report on its relative position with reference to a particular object or location, as well as its orientation.

It should be noted that while the position information (including orientation information) may be used by the radio node to configure communications, it might be used by other applications such as SLAM applications, digital twins, third party applications. An example of its application device could be a head mount which will report its sensing information e.g. orientation to its digital twins and such information will be analysed by its digital twin which may further help to optimise head mount operations.

FIG. 10 illustrates another example control message for reporting position information which comprises orientation information. It will be appreciated that the teachings provided above in respect of reporting techniques and messages apply equally to the reporting of orientation information. In this example, the control message, e.g. the MAC CE message comprises three fields, one for each of the pitch, roll and yaw measurements. While in this example, each field is of 8 bits, in other cases, the reporting may be configure to report a pitch, roll or yaw measurement using less or more than 8 bits. In other words, the information regarding Pitch, Roll and/or Yaw may be quantize differently, thereby adjusting a trade-off between signalling overhead (where fewer reporting bits are considered preferable) and measurement accuracy (where more reporting bits are considered preferable).

The discussion and teachings above regarding using one or more control messages (e.g. MAC-CEs), for example depending on size and frequency of updates, are equally applicable. Accordingly, a variable size control message and/or one or more fixed size control messages may be used, RLC and/or PDCP messages (such as control or data PDUs) may alternatively or additionally be used. As above, in some cases PDCP control or data PDUs may be considered useful, in particular when CU and DU entities (or their equivalents) are co-located or where the scheduler is located physically and/or logically closer to where PDCP entity is hosted, and a PDCP data PDU may be also be used in cases where the current AS security context is used.

It will also be appreciated that the orientation information may be associated with a time stamp for the base station or RAN to determine a time associated with the measurements. In some cases, the timestamp might be provided in a format similar to that illustrated in FIG. 6. Additionally or alternatively, the terminal may also report the its position as absolute axis coordinates (e.g. in the x,y,z coordinate system). This may be done within the orientation information report, or in a separate report or message if this information is already unknown by the radio node.

Regarding the reporting and as mentioned above, the orientation information is one type of position information and the same reporting configuration teachings and techniques discussed above may be applied when reporting orientation information. For example, the discussions regarding reporting configuration for reporting on an ad-hoc, on request and/or periodic mode, timer and time windows, trigger conditions etc. are equally applicable to the reporting of—and to the configuration of—orientation information.

Likewise, the teachings and techniques discussed above in respect of which measures the radio node might take based on the reported position information apply equally to reported position information which includes orientation information. This may include, amongst other things, a scheduler deciding which beam should be activated and/or what PMI and/or RI should be used; a scheduler determining one or more transmission parameters e.g. one or more of time, frequency and MCS configuration for a following scheduling opportunity(ies) based on the position information, for example based on how the propagation characteristics are evolving; the radio node determining a measurement reporting configuration; etc.

Location Server Reporting

The position information, such as the orientation information may additionally be included in a message to a location, such as an LTE Positioning Protocol "LPP" message or equivalent, from the terminal to a location server. When sent in this manner, the position information could be transparent to radio node—however the radio node will receive it separately through the reporting from the terminal via the control message. If the terminal is sending position information to the location server might use an existing information element "IE" (e.g. the Sensor-MotionInformation IS already defined for the message ProvideLocationInformation) or use a newly defined IE.

After location server receives this information, it can use it or make it available (e.g. forward) to other application server to use (e.g. digital twins application servers in the example above.

In some cases, the location server may send the location information to the radio node, wherein the terminal can thus be indirectly notifying the radio node of the location information, via the location or LCS server.

As mentioned above, the discussion above often refers to a radio node, or a base station, however the radio node is not limited to a base station and may comprise one or more of: an RRH, DU, CU, TRP, relay node, another terminal (e.g. in direct communication with the terminal at hand), etc.

Accordingly, teachings and techniques are provided herein, which is expected to improve the configuration of communications (e.g. data communications or reporting communications) between a terminal and a radio node (e.g. a radio node providing a wireless interface for the terminal to communicate with the radio node), which is expected to re-use at least some of the measurements made by the terminal for application-level services or applications (e.g. SLAM or other location-base services).

As will be appreciated, the present disclosure is provided using current terminology and concepts as an illustration, but the present disclosure is not limited to these. For example, the references to a CQI or a particular protocol can be interpreted as references to a channel quality measure or to any protocol providing the similar functions (or some of the same functions), respectively.

It will be appreciated that while the present disclosure has in some respects focused on implementations in a LTE or 5G/NR network as such a network is expected to provide the primary use case at present, the same teachings and principles can also be applied to other wireless telecommunications systems. Thus, even though the terminology used herein is generally the same or similar to that of the 5G (or LTE) standards, the teachings are not limited to the present versions of 5G (or LTE) and could apply equally to any appropriate arrangement not based on 5G/LTE, for example any arrangement possibly compliant with any future version of an LTE, 5G, 6G or other standards—defined by the 3GPP standardisation groups or by other groups.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order than listed (i.e.

the order is not prescriptive), or simultaneously or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example, transmitting a single message, e.g. in a particular protocol, may involve using several resource elements in an LTE or NR environment such that several signals at a lower layer correspond to a single message at a higher layer. In addition, transmissions from one node to another may relate to the transmission of any one or more of user data, system information, control signalling and any other type of information to be transmitted. It will also be appreciated that some information may be notified or indicated implicitly rather than through the use of an explicit indicator.

Additionally, whenever an aspect is disclosed in respect of an apparatus or system, the teachings are also disclosed for the corresponding method and for the corresponding computer program. Likewise, whenever an aspect is disclosed in respect of a method, the teachings are also disclosed for any suitable corresponding apparatus or system as well as for the corresponding computer program. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example, any one or more of a radio node or network node may be configured accordingly if appropriate, so long as it is technically feasible and not explicitly excluded.

Whenever the expressions "greater than" or "smaller than" or equivalent are used herein, it is intended that they disclose both alternatives "and equal to" and "and not equal to" unless one alternative is expressly excluded.

Further particular and preferred aspects of the present invention are set out in the accompanying independent and dependent claims. It will be appreciated that features of the dependent claims may be combined with features of the independent claims in combinations other than those explicitly set out in the claims, so long as they are technically plausible and feasible.

Thus, the foregoing discussion discloses and describes merely illustrative examples of the present disclosure and this disclosure is intended to be illustrative, but not limiting of the scope of the invention. The disclosure, including any readily discernible variants or equivalents of the teachings herein, define, in part, the scope of the foregoing claim terminology such that no inventive subject matter is dedicated to the public.

Also, while the examples above have been described using the example of communications between a terminal and a base station, the skilled person will appreciate that the communications may be between a terminal and one or more of: a base station, a TRP, a RRH (Remote Radio Head), a mobile terminal (e.g. connected through a side-link or PC5 interface), a relay, any radio access network node or more generally any other type radio node. It should also be noted that the radio node may be a node that may be fixed (e.g. a conventional base station, a fixed-position relay or D2D terminal) or may be a node at a mobile (non-fixed) location, such as a mobile base station or relay, a conventional terminal which may move and change location, etc.

Also even in cases where the communications can viewed from the perspective of being between a terminal and a base station or radio node, in some cases the communications may be sent through another network node, for example a relay or a next hop toward the (destination) network node.

Respective features of the present disclosure are defined by the following numbered clauses:

Clause 1. A method of configuring communications in a mobile telecommunications system, the mobile telecommunications system comprising a radio node and at least a terminal, wherein the radio node is configured to provide an air interface to the terminal for communicating with the terminal, wherein the method comprises:

the terminal determining position information for the terminal;

the terminal transmitting a control message to the radio node, the control message notifying the radio node of the position information for the terminal; and the radio node determining one or more configuration for communicating with at least the terminal based on the position information.

Clause 2. The method of Clause 1, wherein the position information comprises one or both of absolute position information and relative position information, wherein relative position information is indicative of a relative position of the terminal with respect to the radio node.

Clause 3. The method of Clause 2, wherein relative position information comprises one or more of: angle related information;

timing related information;

geographical position information; and orientation information comprising one of more of a pitch, roll and yaw measurement.

Clause 4. The method of any preceding Clause, wherein the position information comprises one or more of: Angle of Arrival "AoA" information, Time of Arrival "ToA" information, Time Difference of Arrival "TDoA", Received Signal Strength "RSS", Differential Received Signal Strength "DRSS", pitch measurement, roll measurement and yaw measurement.

Clause 5. The method of any preceding Clause, wherein the radio node determining one or more configuration comprises the radio node determining, based on the position information, one or more of:

to activate a beam for communicating with the terminal;

to determine a precoding matric indicator to be adopted for communicating with the terminal;

to determine a rank indicator to be adopted for communicating with the terminal;

to active a further radio node for communicating with the terminal, jointly with the radio node or instead of the radio node;

one or more scheduling time opportunities for transmitting one or more signals to the terminal;

a configuration of a reporting mode of the terminal; and a configuration of at least one of a number of reporting occasions, a reporting period, a reporting timer, a type of information to report.

Clause 6. The method of Clause 5, wherein the radio node determining a configuration of a reporting mode comprises the radio node one or more of:

determining to activate of one or both of an ad-hoc reporting mode and a periodic reporting mode;

configuring an ad-hoc reporting mode;

configuring a periodic reporting mode;

configuring a number of reporting occasions;

configuring a reporting period;

configuring a timer for reporting position information, wherein the terminal stops transmitting control messages notifying the radio node of position information after expiry of the timer;

configuring a time window for reporting position information, wherein the terminal is configured to transmit control messages to notify the radio node of the position information when within the time window and to stop transmitting control messages notifying the radio node of the position when outside of the time window; and configuring a trigger condition for the terminal, wherein the terminal is configured to transmit the control message notifying the radio node of the position information upon determining that the trigger condition is met.

Clause 7. The method of Clause 6 further comprising:

the radio node notifying the terminal of the determined configuration of the reporting mode; and the terminal transmitting a further control message based on the configuration of the reporting mode, the further control message notifying the radio node of further position information for the terminal.

Clause 8. The method of any preceding Clause, wherein the terminal is configured to transmit the control message notifying the radio node of the position information upon determining that a reporting trigger condition is met.

Clause 9. The method of any preceding Clause, wherein the control message is at least one of: a MAC message, a MAC-CE message, a PDCP control PDU, a PDCP data PDU an RLC control PDU, an RLC data PDU, a layer 1 message, a UCI message and an RRC message.

Clause 10. The method of any preceding Clauses, further comprising the terminal transmitting an additional message, the additional message being sent to a location server and comprising the position information.

Clause 11. A system for configuring communications in a mobile telecommunications network, the system comprising a radio node and a terminal, wherein the radio node is configured to provide an air interface to the terminal for communicating with the terminal, wherein:

the terminal is configured to determine position information for the terminal;

the terminal is configured to transmit a control message to the radio node, the control message notifying the radio node of the position information for the terminal; and the radio node is configured to determine one or more configuration for communicating with at least the terminal, based on the position information.

Clause 12. The system of Clause 11, further configured to implement the method of any one of Clauses 1 to 10.

Clause 13. A method of operating a terminal in a mobile telecommunications system, the mobile telecommunications system comprising a radio node and the terminal, wherein the radio node is configured to provide an air interface to the terminal for communicating with the terminal, wherein the method comprises:

determining position information for the terminal;

transmitting a control message to the radio node, the control message notifying the radio node of the position information for the terminal; and communicating with the radio node based on one or more configuration determined by the radio node in response to transmitting the position information.

Clause 14. The method of Clause 13, further comprising:

receiving, in response to transmitting the position information, a notification from the radio node of a determined configuration of a reporting mode for the terminal to report further position information; and the terminal transmitting a further control message based on the configuration of the reporting mode, the further control message notifying the radio node of the further position information for the terminal.

Clause 15. The method of Clause 13 or 14, further comprising transmitting the control message notifying the radio node of the position information upon determining that a reporting trigger condition is met.

Clause 16. The method of any one of Clauses 13 to 15, further comprising transmitting an additional message, the additional message being sent to a location server and comprising the position information.

Clause 17. A terminal for use in a mobile telecommunications system, the mobile telecommunications system comprising a radio node and the terminal, wherein the radio node is configured to provide an air interface to the terminal for communicating with the terminal, wherein the terminal is configured to:

determine position information for the terminal;

transmit a control message to the radio node, the control message notifying the radio node of the position information for the terminal; and communicate with the radio node based on one or more configuration determined by the radio node in response to transmitting the position information.

Clause 18. The terminal of Clause 17 being further configured to implement the method of any of Clauses 13 to 16.

Clause 19. Circuitry for a terminal for use in a mobile telecommunications system, the mobile telecommunications system comprising a radio node and the terminal, wherein the radio node is configured to provide an air interface to the terminal for communicating with the terminal, wherein the circuitry comprises a controller element and a transceiver element configured to operate together to communicate with the base station via the air interface and wherein the controller element and the transceiver element are further configured to operate together to:

determine position information for the terminal;

transmit a control message to the radio node, the control message notifying the radio node of the position information for the terminal; and communicate with the radio node based on one or more configuration determined by the radio node in response to transmitting the position information.

Clause 20. Circuitry for a terminal for use in a mobile telecommunications system, the mobile telecommunications system comprising a radio node and the terminal, wherein the radio node is configured to provide an air interface to the terminal for communicating with the terminal, wherein the circuitry comprises a controller element and a transceiver element configured to operate together to communicate with the base station via the air interface and wherein the controller element and the transceiver element are further configured to operate together to implement the method of any of Clauses 13 to 16.

Clause 21. A method of operating a radio node in a mobile telecommunications system, the mobile telecommunications system comprising the radio node and a terminal, wherein the radio node is configured to provide an air interface to the terminal for communicating with the terminal, wherein the method comprises:

receiving, from the terminal, a control message notifying the radio node of position information for the terminal, wherein the position information is determined by the terminal; and determining one or more configuration for communicating with at least the terminal based on the position information.

Clause 22. The method of Clause 21, wherein determining one or more configuration comprises determining, based on the position information, one or more of:

to activate a beam for communicating with the terminal;

to determine a precoding matric indicator to be adopted for communicating with the terminal;

to determine a rank indicator to be adopted for communicating with the terminal;

to active a further radio node for communicating with the terminal, jointly with the radio node or instead of the radio node;

one or more scheduling time opportunities for transmitting one or more signals to the terminal;

a configuration of a reporting mode of the terminal; and a configuration of at least one of a number of reporting occasions, a reporting period, a reporting timer, a type of information to report.

Clause 23. The method of Clause 22, wherein determining a configuration of a reporting mode comprises one or more of:

determining to activate of one or both of an ad-hoc reporting mode and a periodic reporting mode;

configuring an ad-hoc reporting mode;

configuring a periodic reporting mode;

configuring a number of reporting occasions;

configuring a reporting period;

configuring a timer for reporting position information, wherein the terminal stops transmitting control messages notifying the radio node of position information after expiry of the timer;

configuring a time window for reporting position information, wherein the terminal is configured to transmit control messages to notify the radio node of the position information when within the time window and to stop transmitting control messages notifying the radio node of the position when outside of the time window; and configuring a trigger condition for the terminal, wherein the terminal is configured to transmit the control message notifying the radio node of the position information upon determining that the trigger condition is met.

Clause 24. The method of Clause 23 further comprising:

notifying the terminal of the determined configuration of the reporting mode; and receiving, from the terminal, a further control message based on the configuration of the reporting mode, the further control message notifying the radio node of further position information for the terminal.

Clause 25. A radio node for use in a mobile telecommunications system, the mobile telecommunications system comprising the radio node and a terminal, wherein the radio node is configured to provide an air interface to the terminal for communicating with the terminal, wherein the radio node is further configured to:

receive, from the terminal, a control message notifying the radio node of position information for the terminal, wherein the position information is determined by the terminal; and determine one or more configuration for communicating with at least the terminal based on the position information.

Clause 26. The radio node of Clause 25, being further configured to implement the method of any of Clauses 21 to 24.

Clause 27. The radio node of Clause 25 or 26, wherein the radio node comprises one or more of: a base station, an Remote Radio Head "RRH", a Distributed Unit "DU", a Centralised Unit "CU", transmission and reception point "TRP", relay node and a further terminal.

Clause 28. Circuitry for a radio node for use in a mobile telecommunications system, the mobile telecommunications system comprising a radio node and the terminal, wherein the circuitry comprises a controller element and a transceiver element configured to operate together to provide an air interface to the terminal for communicating with the terminal and wherein the controller element and the transceiver element are further configured to operate together to:

receive, from the terminal, a control message notifying the radio node of position information for the terminal, wherein the position information is determined by the terminal; and determine one or more configuration for communicating with at least the terminal based on the position information.

Clause 29. Circuitry for a radio node for use in a mobile telecommunications system, the mobile telecommunications system comprising a radio node and the terminal, wherein the circuitry comprises a controller element and a transceiver element configured to operate together to provide an air interface to the terminal for communicating with the terminal and wherein the controller element and the transceiver element are further configured to operate together to implement the method of any of Clauses 21 to 24.

REFERENCES

[1] 3GPP document RP-182090, "Revised SID: Study on NR Industrial Internet of Things (IoT)," 3GPP RAN #81.

[2] Holma H, and Toskala A., "LTE for UMTS OFDMA and SC-FDMA based radio access", John Wiley and Sons, 2009

[3] Andre Bourdoux et al., "6G White Paper on Localization and Sensing", 3 Jun. 2020

[4] 3GPP document TS 37.355 "LTE Positioning Protocol (LPP)" v16.3.0, January 2021

The invention claimed is:

1. A method of configuring communications in a mobile telecommunications system, the mobile telecommunications system comprising a radio node and at least a terminal, wherein the radio node is configured to provide an air interface to the terminal for communicating with the terminal, wherein the method comprises:

the terminal determining position information for the terminal, wherein the position information comprises orientation information comprising one or more of a pitch, roll and yaw measurement;

the terminal transmitting a control message to the radio node, the control message notifying the radio node of the position information for the terminal; and the radio node determining one or more configuration for communicating with at least the terminal based on the position information.

2. The method of claim 1, wherein the position information comprises one or both of absolute position information and relative position information, wherein relative position information is indicative of a relative position of the terminal with respect to the radio node.

3. The method of claim 2, wherein relative position information comprises one or more of:

angle related information;

timing related information;

geographical position information; and orientation information comprising one of more of a pitch, roll and yaw measurement.

4. The method of claim 1, wherein the position information comprises one or more of: Angle of Arrival "AoA" information, Time of Arrival "ToA" information, Time Difference of Arrival "TDoA", Received Signal Strength "RSS", Differential Received Signal Strength "DRSS", pitch measurement, roll measurement and yaw measurement.

5. The method of claim 1, wherein the radio node determining one or more configuration comprises the radio node determining, based on the position information, one or more of:

to activate a beam for communicating with the terminal;

to determine a precoding matrix indicator to be adopted for communicating with the terminal;

to determine a rank indicator to be adopted for communicating with the terminal;

to active a further radio node for communicating with the terminal, jointly with the radio node or instead of the radio node;

one or more scheduling time opportunities for transmitting one or more signals to the terminal;

a configuration of a reporting mode of the terminal; and a configuration of at least one of a number of reporting occasions, a reporting period, a reporting timer, a type of information to report.

6. The method of claim 5, wherein the radio node determining a configuration of a reporting mode comprises the radio node one or more of:

determining to activate of one or both of an ad-hoc reporting mode and a periodic reporting mode;

configuring an ad-hoc reporting mode;

configuring a periodic reporting mode;

configuring a number of reporting occasions;

configuring a reporting period;

configuring a timer for reporting position information, wherein the terminal stops transmitting control messages notifying the radio node of position information after expiry of the timer;

configuring a time window for reporting position information, wherein the terminal is configured to transmit control messages to notify the radio node of the position information when within the time window and to stop transmitting control messages notifying the radio node of the position when outside of the time window; and configuring a trigger condition for the terminal, wherein the terminal is configured to transmit the control message notifying the radio node of the position information upon determining that the trigger condition is met.

7. The method of claim 6, further comprising:

the radio node notifying the terminal of the determined configuration of the reporting mode; and the terminal transmitting a further control message based on the configuration of the reporting mode, the further control message notifying the radio node of further position information for the terminal.

8. The method of claim 1, wherein the terminal is configured to transmit the control message notifying the radio node of the position information upon determining that a reporting trigger condition is met.

9. The method of claim 1, wherein the control message is at least one of: a Medium Access Control (MAC) message, a MAC Control Element (-CE) message, a Packet Data Convergence Protocol (PDCP) control Protocol Data Unit (PDU), a PDCP data PDU, a Radio Link Control (RLC) control PDU, an RLC data PDU, a layer 1 message, a Uplink Control Information (UCI) message and a Radio Resource Control (RRC) message.

10. A terminal for use in a mobile telecommunications system, the mobile telecommunications system comprising a radio node and the terminal, wherein the radio node is configured to provide an air interface to the terminal for communicating with the terminal, wherein the terminal is configured to:

determine position information for the terminal, wherein the position information comprises orientation information comprising one or more of a pitch, roll and yaw measurement;

transmit a control message to the radio node, the control message notifying the radio node of the position information for the terminal; and communicate with the radio node based on one or more configuration determined by the radio node in response to transmitting the position information.

11. A radio node for use in a mobile telecommunications system, the mobile telecommunications system comprising the radio node and a terminal, wherein the radio node is configured to provide an air interface to the terminal for communicating with the terminal, wherein the radio node is further configured to:

receive, from the terminal, a control message notifying the radio node of position information for the terminal, wherein the position information is determined by the terminal and comprises orientation information comprising one or more of a pitch, roll and yaw measurement; and determine one or more configuration for communicating with at least the terminal based on the position information.

12. The radio node of claim 11, wherein the radio node comprises one or more of: a base station, a Remote Radio Head "RRH", a Distributed Unit "DU", a Centralised Unit "CU", transmission and reception point "TRP", relay node and a further terminal.

* * * * *